United States Patent
Faaborg et al.

(10) Patent No.: US 12,160,746 B2
(45) Date of Patent: Dec. 3, 2024

(54) LEVERAGING CLOUD ANCHORS IN AUTHENTICATION

(71) Applicant: Google LLC, Mountain View, CA (US)

(72) Inventors: Alexander James Faaborg, Mountain View, CA (US); Brett Barros, San Mateo, CA (US); Michael Schoenberg, San Francisco, CA (US)

(73) Assignee: Google LLC, Mountain View, CA (US)

( * ) Notice: Subject to any disclaimer, the term of this patent is extended or adjusted under 35 U.S.C. 154(b) by 118 days.

(21) Appl. No.: 17/596,313

(22) PCT Filed: Dec. 9, 2020

(86) PCT No.: PCT/US2020/070886
§ 371 (c)(1),
(2) Date: Dec. 7, 2021

(87) PCT Pub. No.: WO2022/125125
PCT Pub. Date: Jun. 16, 2022

(65) Prior Publication Data
US 2022/0182836 A1   Jun. 9, 2022

(51) Int. Cl.
*H04W 12/33* (2021.01)
*H04W 12/033* (2021.01)
(Continued)

(52) U.S. Cl.
CPC ......... *H04W 12/33* (2021.01); *H04W 12/033* (2021.01); *H04W 12/068* (2021.01); *H04W 84/18* (2013.01)

(58) Field of Classification Search
None
See application file for complete search history.

(56) References Cited

U.S. PATENT DOCUMENTS

| 6,776,334 B1 * | 8/2004 | Garg .................. G01S 5/16 235/382 |
| 10,373,381 B2 | 8/2019 | Nuernberger et al. |

(Continued)

FOREIGN PATENT DOCUMENTS

| CN | 111161719 A | 5/2020 |
| EP | 2495944 A2 | 9/2012 |

(Continued)

OTHER PUBLICATIONS

"Create an Effective Anchor Experience by Using Azure Spatial Anchors", Guidelines for effective anchor experiences, Azure Spatial Anchors/Microsoft Docs, retrieved on Jul. 13, 2020 from https://docs.microsoft.com/en-us/azure/spatial-anchors/concepts/guidelines-effective-anchor-experiences, Feb. 24, 2019, 7 pages.

(Continued)

*Primary Examiner* — Frantz Bataille
(74) *Attorney, Agent, or Firm* — Brake Hughes Bellermann LLP

(57) ABSTRACT

Systems and methods are described for authenticating devices. The systems and methods may include detecting, by a sensor on a wearable device, at least one cloud anchor that includes an identifier associated with a network and configured for a physical environment. In response to detecting that a location associated with the at least one cloud anchor is within a threshold distance of the wearable device and detecting that the wearable device has access to the at least one cloud anchor, triggering extraction of the identifier from the at least one cloud anchor. The systems and methods may also include joining the wearable device to the network based on a received authentication corresponding to the extracted identifier.

20 Claims, 7 Drawing Sheets

(51) Int. Cl.
*H04W 12/06* (2021.01)
*H04W 84/18* (2009.01)

(56) References Cited

U.S. PATENT DOCUMENTS

| | | |
|---|---|---|
| 2013/0256407 A1 | 10/2013 | Su et al. |
| 2014/0208387 A1 | 7/2014 | Ganesh et al. |
| 2016/0014820 A1 | 1/2016 | Dhanabalan et al. |
| 2016/0127900 A1 | 5/2016 | John Archibald et al. |
| 2020/0068334 A1 | 2/2020 | Magariyachi et al. |
| 2020/0134144 A1 | 4/2020 | Depaolo et al. |
| 2021/0326428 A1* | 10/2021 | Edwards ................ G06V 20/20 |

FOREIGN PATENT DOCUMENTS

| | | |
|---|---|---|
| JP | 2007221785 A | 8/2007 |
| JP | 2016104180 A | 6/2016 |
| JP | 2018181256 A | 11/2018 |
| JP | 2020145654 A | 9/2020 |
| WO | 2019183593 A1 | 9/2019 |

OTHER PUBLICATIONS

Office Action for Japanese Application No. 2023-535026 (with English translation), mailed Sep. 24, 2024, 6 pages.
International Search Report and Written Opinion for PCT Application No. PCT/US2020/070886, mailed on Sep. 27, 2021, 19 pages.
Invitation to Pay Additional Fees for PCT Application No. PCT/US2020/070886, mailed on Aug. 3, 2021, 11 pages.
"Aranchor", Apple Developer Documentation, retrieved on Jul. 13, 2020 from https://developer.apple.com/documentation/arkit/aranchor, 3 pages.
"Create an Effective Anchor Experience by Using Azure Spatial Anchors", Guidelines for effective anchor experiences, Azure Spatial Anchors/Microsoft Docs, retrieved on Jul. 13, 2020 from https://docs.microsoft.com/en-us/azure/spatial-anchorslconcepts/guidelines-effective-anchor-experiences, Feb. 24, 2019, 7 pages.

* cited by examiner

LEVERAGING CLOUD ANCHORS IN AUTHENTICATION

CROSS-REFERENCE TO RELATED APPLICATION

This application is a 35 U.S.C. § 371 National Phase Entry Application from PCT/US2020/070886, filed on Dec. 9, 2020, entitled "LEVERAGING CLOUD ANCHORS IN AUTHENTICATION", the disclosure of which is incorporated herein by reference in its entirety.

TECHNICAL FIELD

This description generally relates to authenticating devices.

BACKGROUND

A mobile device may be used to control one or more electronic devices in buildings, such as homes and offices. Such buildings often include many devices that can be accessed and/or controlled remotely. For example, a lightbulb may be toggled or otherwise adjusted by a mobile device using various types of wireless communication. In some examples, such mobile devices may include a camera to capture image data and image recognition software to process the image data in order to detect a device in the building that may be in a field of view of the camera onboard the mobile device.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, systems and methods are described for detecting, by a sensor on a wearable device, at least one cloud anchor that includes an identifier associated with a network and configured for a physical environment. In response to detecting that a location associated with the at least one cloud anchor is within a threshold distance of the wearable device and detecting that the wearable device has access to the at least one cloud anchor, the systems and methods may include triggering extraction of the identifier from the at least one cloud anchor and joining the wearable device to the network based on a received authentication corresponding to the extracted identifier.

These and other aspects can include one or more of the following, alone or in combination. For example, the systems and methods may further include aspects such that the identifier includes an SSID and login credentials, the network is a Wi-Fi network, the identifier is associated with at least one controllable device, the at least one controllable device being a device providing access to the network, and the authentication is received from the at least one controllable device.

In some implementations, the identifier is associated with a 3D map of an Augmented Reality (AR) environment, the 3D map including visual data mapped to the physical environment stored by at least one controllable device within the physical environment and detecting that the wearable device has access to the at least one cloud anchor includes determining whether the wearable device provides data from the sensor to match at least a portion of the visual data mapped to the physical environment. In some implementations, the at least one controllable device is configured to de-authenticate the wearable device from the network in response to detecting that the location of the wearable device is no longer within the threshold distance. In some implementations, the location is determined based on a detecting that the at least one cloud anchor is within a field of view of the wearable device. In addition, the method of claim 1 may comprise one or more (e.g., all) of the following features (or any combination thereof) of claims 6 to 10, as recited below.

In a second general aspect, systems and methods are described for receiving, at a wearable device communicably coupled to a controllable device in a physical environment, a request to access the controllable device, the request determined to be received from an unauthenticated user or device. The systems and methods may further include determining a pose of the wearable device within the physical environment and rendering, in the wearable device, a prompt to select a permission or denial of access to the controllable device by the unauthenticated user or device. In response to receiving permission to access the controllable device, the systems and methods may include authenticating the unauthenticated user or device to access the controllable device from a region of the physical environment, the region defined based on the determined pose of the wearable device and performing the request.

These and other aspects can include one or more of the following, alone or in combination. For example, the region may be defined within a spherical image of the physical environment, the spherical image being based on a 3D map of at least one cloud anchor associated with the physical environment. In some implementations, the systems and methods may include rendering, in the wearable device, another prompt to trigger a user of the wearable device to look in a direction corresponding to the region, capturing an image of the region, the image capturing a portion of the user or device requesting authentication, and storing, by the wearable device, the image in a database of authenticated devices or users.

In some implementations, the systems and methods may include receiving a second request to access the controllable device, rendering, in the wearable device, a prompt to trigger the user of the wearable device to capture an image associated with the second request, receiving a command to capture the image associated with the second request, and comparing the second captured image to the images in the database. In response to determining at least a portion of a match of the second captured image to at least one of the images in the database, the systems and methods may further include triggering performance of the second request.

In some implementations, the request is an audial request spoken by a user in the physical environment, the wearable device determines a direction in which the audial request is received, and the region of the physical environment is determined based on the determined direction in which the audial request is received. In addition, the method of claim 6 described above may comprise one or more (e.g., all) of the following features (or any combination thereof) of claims 1-5 recited above.

Implementations of the described techniques may include hardware, a method or process, or computer software on a computer-accessible medium. The details of one or more implementations are set forth in the accompanying drawings

BRIEF DESCRIPTION OF THE DRAWINGS

Like reference symbols in the various drawings indicate like elements.

DETAILED DESCRIPTION

Figure 1:
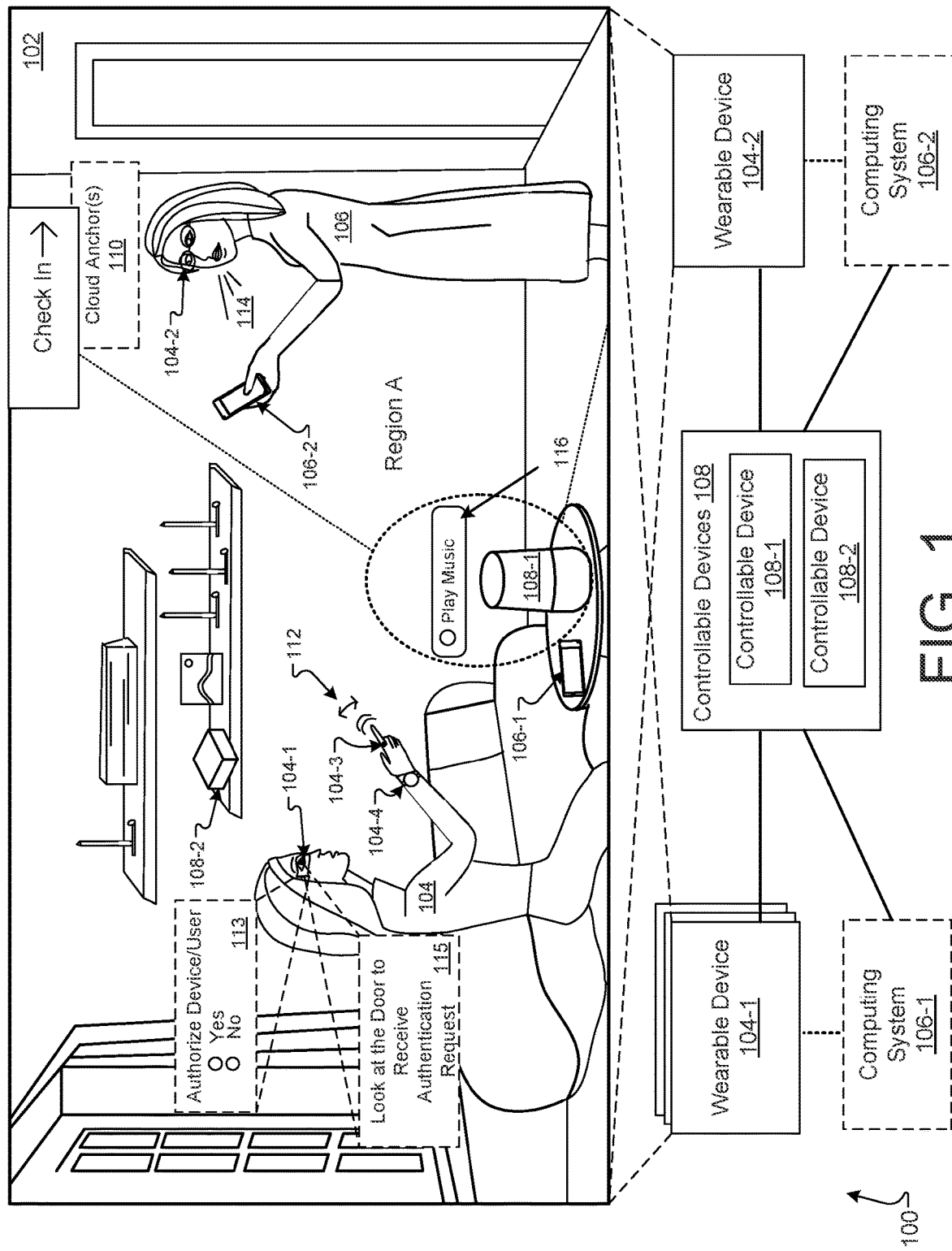
FIG. 1 illustrates an augmented reality (AR) system for authenticating wearable devices, according to implementations described throughout this disclosure.

This document describes examples related to casual authentication for Augmented Reality (AR) wearable electronic devices (i.e., wearable devices). The authentication process may include image-based assessments of an environment surrounding the wearable device. The image-based assessments may take into account locational aspects of the wearable device and/or locational aspects of an electronic device that a wearable device seeks to control or authenticate against. In some implementations, the image-based assessments may take into account locations of cloud anchors associated with the environment.

Devices seeking authentication (e.g., wearable devices) may capture locational aspects of an environment and send such aspects (and/or other data) to another electronic device in the environment. Other electronic devices in the environment may assess the locational information (and/or other data received from the wearable device) to determine whether or not to authenticate the wearable device and/or to determine whether to provide particular data and/or services to the wearable device via the other electronic device(s).

In some implementations, the wearable devices described herein may be casually authenticated by one or more other devices in a physical, virtual, or AR environment. For example, electronic assistant-type devices (e.g., home assistants, automobile assistants) can be used to authenticate other devices in a shared space as well as share particular settings and resources associated with the electronic assistant. In some implementations, other controllable devices such as electronic thermostats, electronic doorbell devices, televisions, security devices, appliances, or other electronic device viewable by a wearable device may be used to authenticate the wearable device and/or other devices in a shared space.

Conventional systems typically do not have a mechanism with which to authenticate requests from devices or users via an assistant device. In particular, conventional systems may receive and execute casual requests (e.g., control the lights, control the music, etc.) in shared settings (e.g., dorm rooms, hotels, office buildings, etc.) and execute such requests without permission of a device owner.

The systems and methods described herein may provide techniques with which to authenticate such permissions by devices owned by guests, for example. Such techniques may provide an advantage to a device owner by enabling the device owner to allocate control of such casual requests to allow particular users to perform requests while disallowing or blocking other users from having requests performed without device owner permission. The techniques may provide a way to set permissions on casual request devices (i.e., devices configured to receive keywords (e.g., "Ok computer . . . " audial requests, device control requests, etc.). The permissions may be enabled by a device owner and bypassed upon receiving an indication (e.g., a gesture, a selection, an audial response, etc.) from the device owner to allow the casual requests from particular devices and/or users. For example, the device owner may gesture toward a device location or a user location that is associated with the request. In some implementations, user interface content may be displayed to a device owner in a wearable device display to request authentication and/or controllable device use approval for a requesting user.

In some implementations, the wearable devices described herein may leverage AR content (e.g., cloud anchors) in order to be authenticated to gain access to network provided services and/or device features (e.g., access to a Wi-Fi network, access to an AR session, access to a device in an environment, etc.). For example, the systems and methods described herein may provide techniques with which to authenticate guest devices to access services in an environment. For example, conventional authentication to Wi-Fi networks/services involves a user that may have to request a password from another user, manually select a network, and manually enter a password. The systems and techniques described herein may leverage virtual cloud anchors (i.e., cloud anchors) to casually authenticate a guest device to Wi-Fi networks (or other services off of such networks) associated with an environment (e.g., a hotel, a home, a property, an office building, etc.). Such authentications may be offered according to service and/or network owner-configured permissions.

In general, this disclosure relates to the use of a wearable device that may capture visual data to identify, based on the visual data, three-dimensional (3D) map information (e.g., a 3D mesh, a 3D feature map, a cloud anchor, etc.) or two-dimensional (e.g., 2D) about a particular physical environment, in order to determine a location of and/or obtain access to a controllable device in a physical space that is at least partially represented by the visual data. Such information may include any amount of visual positioning data about a separate controllable device visible or detectable by the wearable device. The information may be stored locally or stored remotely on a server computer. In some implementations, the information may be used to recover 2D information. In some implementations, the information may be used to detect a three degree of freedom (DoF) position of a controllable device. In some implementations, the information may be used to detect a six DoF position of the controllable device. In some implementations, the information may be used to detect five DoF position of the controllable device. In some implementations, the information may be used to recover 2D and/or 5-DoF map data.

Upon determination of position and/or authentication analysis of other user input, the wearable device can be authenticated to the controllable device and begin controlling the controllable device. User interface (UI) content and/or audio signals may be provided to the wearable device to allow control and/or feedback to a user of the wearable device. In some implementations, the UI content may provide the user of the wearable device with one or more controls to control the controllable device and/or additional information about the controllable device.

The techniques described herein provide an advantage of reserving battery power on wearable devices by using cloud anchors to authenticate the wearable devices to a Wi-Fi network. Such techniques may ensure that the wearable devices need not utilize cellular service, which can quickly drain an electronic device battery faster than utilization of a Wi-Fi service. Instead, the techniques described herein may utilize cloud anchor information to authenticate devices, provide access to Wi-Fi or other networks, and to enable control of controllable devices associated with a physical and/or AR environment.

FIG. 1 illustrates an augmented reality (AR) system 100 for authenticating wearable devices to other electronic devices, according to implementations described throughout this disclosure. Users may enter a physical space, such as environment 102, and may carry one or more computing systems. For example, a first user 104 is shown seated and may be associated with (e.g., or be near) a computing system 106-1 and wearing wearable device 104-1. The computing system 106-1 is a mobile device. The wearable device 104-1 is a pair of AR glasses. Similarly, a second user 106 may enter environment 102. The second user may also have any number of electronic devices. In this example, user 106 is holding a mobile device 106-2 and wearing a wearable device 104-2. Any number of computing systems may be included in environment 102. Similarly, any number of wearable devices may be included in environment 102. For example, additional wearable device 104-3 represents a ring controller that may interact with other devices in environment 102. Similarly, additional wearable device 104-4 represents a smartwatch that may interact with other devices in environment 102.

In some implementations, the computing system 106-1 may be communicably coupled to wearable device 104-1. In some implementations, the wearable device 104-1 may be a standalone device that is not configured, connected, or communicating with another device associated with the user 104. In some implementations, the computing system 106-2 may be communicably coupled to wearable device 104-2. In some implementations, the wearable device 104-2 may be a standalone device that is not configured, connected, or communicating with another device associated with the user 106.

In some implementations, the computing systems 106-1 and 106-2 are auxiliary (i.e., optional) and are not used for interactions within the environment 102. For example, wearable device 104-1 may function standalone to experience networks, services, or other controllable devices in environment 102. Similarly, wearable device 104-2 may operate without computing system 106-2. Thus, wearable devices 104-1 and 104-2 may operate standalone. In some implementations, the wearable device 104-2 may request access to services, networks, etc. via wearable device 104-1.

The users 104, 106 associated with one or more of computing systems 106-1, 106-2 and/or wearable devices 104-1, 104-2 may wish to control one or more controllable devices in environment 102. As shown in environment 102, a first controllable device 108-1 is a digital assistant device and a second controllable device 108-2 is a Wi-Fi router. Any number of controllable devices 108 may be included in environment 102. To control such controllable devices 108 may involve assessing and obtaining authentication from an owner of the particular controllable device 108. The computing systems 106-1, 106-2 and/or wearable devices 104-1, 104-2 may be authenticated by the systems and techniques described herein. Authentication may provide such systems and devices with access to services, networks, controllable devices, and/or permissions associated with such controllable devices. For example, the system 100 and environment 102 may be configured with cloud anchors 110 that may be detected and accessed in order to obtain information that may be used to authenticate wearable devices 104-1, 104-2 in order to obtain access to the particular services, networks, and/or controllable devices. In some implementations, one wearable device (e.g., host AR glasses 104-1) may provide authentication for other wearable devices (e.g., guest AR glasses 104-2).

As used herein, cloud anchors (e.g., virtual cloud anchors) may refer to one or more sets of visual feature points included in a 3D map. Cloud anchors may be associated with a set of persistent visual features that represent physical objects in the physical world. In the AR systems described herein, a wearable device may receive digital information about a host user's environment and may create one or more cloud anchors, such as cloud anchor(s) 110 based on the digital information, where each cloud anchor 110 may represent a portion of a physical space such as a room (or a portion thereof) within a building. A host user may add a virtual object to a virtual scene associated with the room, and the virtual object can then be linked (or fixed to) a position in the cloud anchor 110.

The cloud anchor 110 may be shared with other users, which can join the space and view and interact with content or devices owned by a host user (or another user). In some examples, in order to permit other users to join the host's environment, the host user may locate an identifier of a particular cloud anchor and provide the identifier to another user, where that user may manually enter the identifier to join the AR scene. In some implementations, the cloud anchor may be configured by a host to automatically authenticate particular devices to access objects, devices, services, and/or systems associated with (or communicably coupled to access) the cloud anchor. Each device associated with environment 102 (e.g., computing system 106-1, 106-2 and wearable device 104-1, 104-2) may have access to cloud anchors 110 via image sensors associated with such devices.

In some implementations, a guest wearable device may move through a physical environment gathering data pertaining to feature points of any number of cloud anchors 110. At some point, the combination of feature points may be provided as particular identifiers with which to gain access to a network or device. The identifiers may include one or more feature points associated with one or more cloud anchors 110. For example, if the wearable device 104-2 can produce identifiers associated with particular cloud anchors corresponding to, or configured with, a controllable device, the wearable device 104-2 may then be authenticated to gain access to the network or device.

In operation, the wearable device 104-1 may represent a host (i.e., an owner of controllable devices 108). The user 104 (i.e., the host/owner) may have configured controllable device 108-1 (a digital assistant) and/or controllable device 108-2 (e.g., a Wi-Fi router) to provide casual cloud anchor-based authentication to guest users upon verifying the guest users have access to cloud anchors 110 and provide such verification to a respective wearable device 104-2, wearable device 104-3, wearable device 104-4, computing system 106-1, controllable device 108-1, or controllable device 108-2.

In some implementations, the cloud anchor 110 may be associated with any number of identifiers. For example, the cloud anchor 110 may include position identifiers indicating a position of a physical or virtual object associated with a 3D map of a particular environment. The cloud anchor 110 may alternatively or additionally include identifiers indicating a service, password, and/or other indicator to access a service, a network, a function, a feature, etc.

In one non-limiting example, the system 100 may provide a wearable device access to a network. For example, the user 106 may walk into the lobby environment 102 wearing wearable device 104-2 (e.g., AR glasses). The wearable device 104-2 may include at least one image sensor which may detect at least one cloud anchor (e.g., cloud anchor 110). Cloud anchor 110 may include an identifier associated with at least one controllable device (e.g., controllable device 108-2 representing a Wi-Fi network router). The controllable device 108-2 may be configured for the physical environment 102 to provide Wi-Fi services, for example to any wearable device that detects cloud anchor 110. For example, in response to detecting that a location of the at least one controllable device (e.g., Wi-Fi router 108-2) is within a threshold distance of the wearable device 104-2, the wearable device 104-2 may trigger extraction of the identifier from the at least one cloud anchor 110. For example, the wearable device may automatically request login credentials (e.g., an SSID, username and password) from device 108-2 when moving within the predefined threshold distance of the device 108-2 and/or when moving within a viewing distance of the device 108-2. (i.e., wearable device 104-2 may have the cloud anchor 110 within a field of view, a detectable distance, and/or within another visibly detectable range of device 108-2). In some implementations, the threshold distance may correspond to a threshold time in which it is determined, based on detecting that a particular wearable device 104-2 no longer has access to particular cloud anchors 110, that a time has elapsed and the device 104-2 can no longer view particular cloud anchors. At such a time, the Wi-Fi may be de-authenticated on the wearable device 104-2.

In some implementations, the threshold distance may pertain to a full or partial line of sight for a particular device. For example, the threshold distance may pertain to ensuring that a wearable device (e.g., wearable device 104-2) having a line of sight to the controllable device 108-2). Another example of a threshold distance may pertain to ensuring that the wearable device 104-2, for example, has at least a partial view (i.e., a partial line of sight) of a particular controllable device within environment 102.

Upon requesting the identifier information, the wearable device 104-2 may provide such information to at least one controllable device in a sequence recognized by device 104-2 such that authentication may occur. For example, upon providing the information of the identifier, the wearable device 104-2 may join to the network based on a received authentication of the provided identifier. The device 108-2 may authenticate or the user 104 may authenticate via another device or wearable device associated with environment 102 and/or controllable device 108-2. For example, at least one controllable device may be an electron assistant (e.g., controllable device 108-1) that is configured with controllable device 108-2 (i.e., the network Wi-Fi router) that is providing the network.

In another non-limiting example, the system 100 may authenticate another user or device to use, control, or otherwise access a particular controllable device associated with environment 102. For example, the user 106 may represent a guest and may enter the lobby of environment 102 (i.e., a physical environment). The user 106 may be associated with one or more electronic devices (as shown with devices 104-2 and 106-2). However, the user may not have any devices on her person and may not be associated with any devices of environment 102. Thus, the systems described herein may authenticate to devices and/or may authenticate particular users based on audio (or visual) requests received from such users.

In this example, the user 104 may represent a host for environment 102 and the controllable devices (e.g., controllable device 108-1 and controllable device 108-2) within environment 102. The user 104 may be wearing wearable device 104-1 (e.g., AR glasses), which may be used to authenticate other users to devices in environment 102. For example, the user 106 may enter environment 102 and may provide a request to access a controllable device 1081, for example. The request may be made via device 104-2, device 106-2, or another device associated with user 106. In some implementations, the request may instead include an audial utterance or visual sign performed by user 106.

The user 106 may perform the request to use, control, or otherwise access an electronic assistant (such as controllable device 108-1). In operation, the system 100 may receive the request at the wearable device 104-1 (or device 104-3 or device 104-4). One or all wearable devices 104-1, 104-3, or 104-4 may be communicably coupled to the controllable device 108-1 such that any of the devices 104-1, 104-3, or 104-4 can authenticate access to controllable device 108-1. In this example, the request is determined by the wearable device 104-1, for example, to have been received from an unauthenticated user or device (e.g., uttered from user 106 or received from unauthorized computing device 106-2 or wearable device 104-2).

Upon receiving the request from an unauthorized user or device, the wearable device 104-1 may determine a pose of itself. The pose may be of the wearable device 104-1 owned by the host and within the physical environment. The wearable device 104-1 may then trigger rendering (on a display associated with itself) a prompt 113 to select a permission or denial of access to the controllable device 108-1 by the unauthenticated user 106 or device (device 106-2 or device 104-2). The prompt 113 depicts a question and selectable controls, but other prompts are of course possible. For example, additional prompt 115 directs the user 104 to look at a door in the environment 102 in order to receive authentication requests. The user 104 may carry out the gesture of looking at the door of the room to receive (i.e., be provided) such authentication requests.

In some implementations, the user 104 of wearable device 104-1 may perform a gesture 112 in view of a camera associated with wearable device 104-1, for example, to indicate approval to device 104-1 (i.e., the AR glasses). Such approval may then enable the authentication of user 106 or devices 104-2 or 106-2, which can allow the request to be carried out on controllable device 108-1. For example, if the request was from device 106-2 to play music from a selected playlist or the request was an audible request 114 to play music, the authentication can enable device 108-1 to play music, as shown by indicator representing a request 116, based at least in part on the approval associated with wearable device 104-1.

In response to receiving permission to access the controllable device 108-1 or in response to a performed gesture by user 104 viewable by device 104-1, the wearable device 104-1 may authenticate the unauthenticated user or device to access the controllable device 108-1 from a region of the physical environment and may then perform the request. The region of the physical environment may be defined based on the determined pose of the wearable device. For example, the region may be determined using an onboard camera of wearable device 104-1 or an audio sensor associated with device 104-1. In this example, Region A is an example of a defined region based on a location of user 106 (or devices owned by user 106). Other defined regions and subregions within environment 102 are of course possible.

Figure 2:
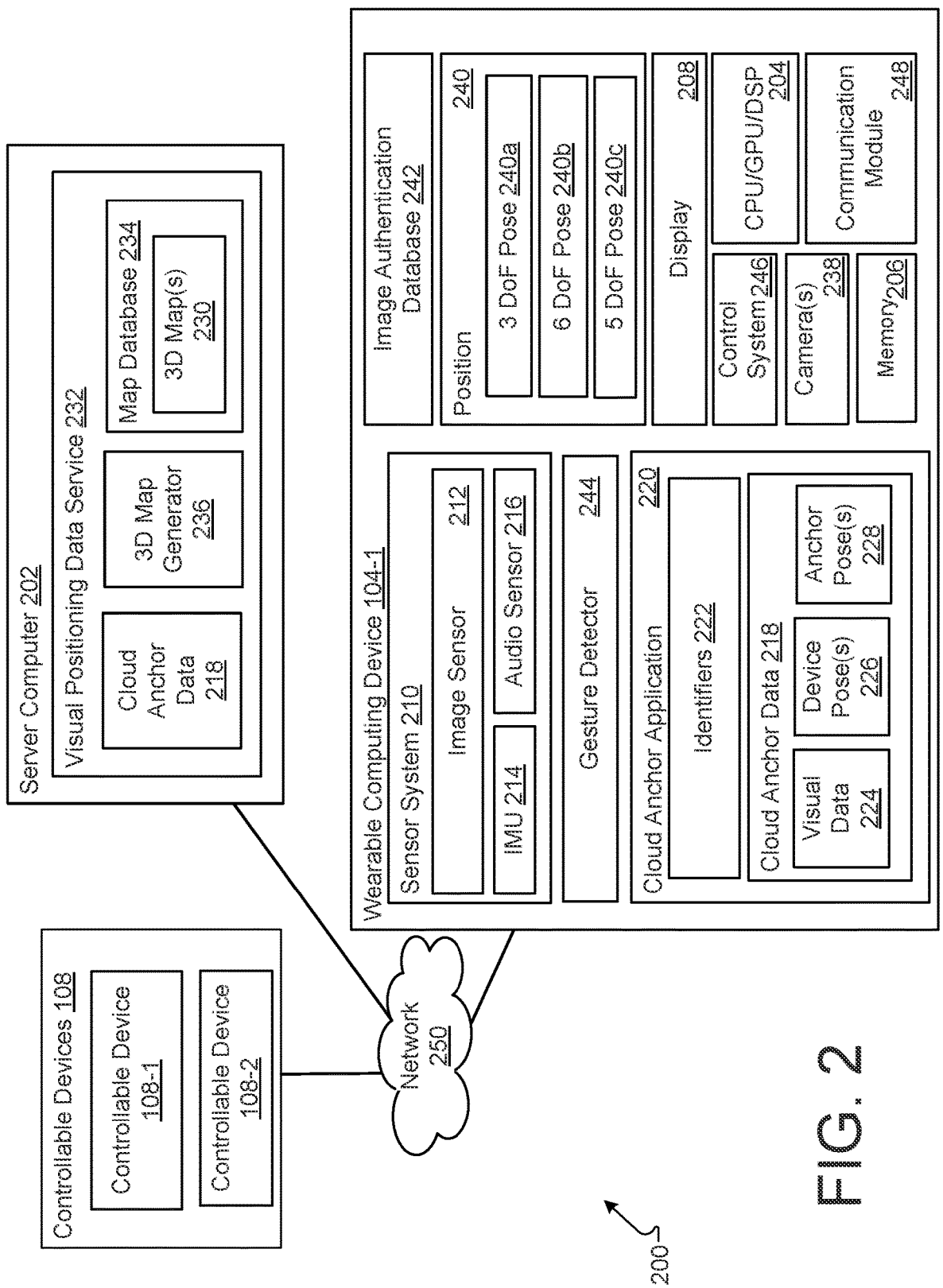
FIG. 2 illustrates a block diagram of an example system for authenticating devices in a physical and/or AR environment, according to implementations described throughout this disclosure.

FIG. 2 illustrates a block diagram of an example system 200 for authenticating devices in a physical and/or AR environment, according to implementations described throughout this disclosure. The system 200 includes at least the first wearable device 104-1, as described in FIG. 1. The device 104-1 may receive requests to access controllable devices 108. In some implementations, a server computer 202 may be utilized to access, generate, view, and use cloud anchors. In some implementations, the wearable computing device 104-1 may perform and store operations described with respect to the server computer 202, thus eliminating the use of server computer 202 with the techniques described herein.

In some examples, the wearable device 104-1 includes one or more computing devices, where at least one of the devices is a display device capable of being worn on or in proximity to the skin of a person. In some examples, the wearable device 104-1 is or includes a wearable device. The wearable device may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable device includes AR glasses (e.g., smartglasses). AR glasses are an optical head-mounted display device designed in the shape of a pair of eyeglasses.

In some examples, the wearable device 104-1 includes a wearable device (e.g., AR glasses) and a computing device (e.g., a mobile computing device such as a smartphone, tablet, laptop, or another wearable device such as a smart watch). The wearable device 104-1 may be connected to the computing device via a wireless connection such as a short-range connection (e.g., Bluetooth connection or near-field communication (NFC) connection) or an Internet connection (e.g., Wi-Fi or mobile network). In some examples, some of the components of the wearable device 104-1 are included in the wearable device and some of the components of the wearable device 104-1 are included in the computing device.

The wearable device 104-1 includes one or more processors 204, which may be formed in a substrate configured to execute one or more machine executable instructions or pieces of software, firmware, or a combination thereof. The processors 204 can be semiconductor-based—that is, the processors can include semiconductor material that can perform digital logic. Such processors 204 may include CPUs, GPUs, and/or DSPs, just to name a few examples.

The wearable device 104-1 can also include one or more memory devices 206. The memory devices 206 may include any type of storage device that stores information in a format that can be read and/or executed by the processor(s) 204. The memory devices 206 may store applications and modules that, when executed by the processor(s) 204, perform certain operations. In some examples, the applications and modules may be stored in an external storage device and loaded into the memory devices 206. The wearable device 104-1 includes one or more antennas (not shown) configured to communicate with other computing devices.

The wearable device 104-1 includes a display 208. The display 208 may include a liquid crystal display (LCD), a light-emitting diode (LED) display, an organic light-emitting display (OLED), an electro-phoretic display (EPD), or a micro-projection display adopting an LED light source. In some examples, the display 208 is projected onto the field of view of the user. In some examples, in the case of AR glasses, the display 208 may provide a transparent or semi-transparent display such that the user wearing the glasses can see images provided by the display 208 but also information located in the field of view of the AR glasses behind the projected images.

The wearable device 104-1 includes a sensor system 210. The sensor system 210 includes an image sensor 212 configured to obtain image data. In some examples, the sensor system 210 includes multiple image sensors 212. The image sensor 212 can take pictures and record video. The sensor system 210 may include an inertial measurement unit (IMU) 214. The IMU 214 may detect motion, movement, and/or acceleration of the wearable device 104-1. The IMU 214 may include various different types of sensors such as, for example, an accelerometer, a gyroscope, a magnetometer, and other such sensors. The sensor system 210 includes an audio sensor 216 configured to detect audio received by wearable device 104-1. The sensor system 210 may include other types of sensors such as a light sensor, a distance and/or proximity sensor, a contact sensor such as a capacitive sensor, a timer, and/or other sensors and/or different combination(s) of sensors. The sensor system 210 may be used to obtain information associated with cloud anchor data 218 using cloud anchor application 220 and identifiers 222 associated with 3D maps 230 associated with such cloud anchors.

Identifiers 222 may include information associated with one or more cloud anchors 110. The information may include location data that corresponds to computing devices, wearable devices, virtual objects, and/or physical objects associated with a physical environment. In some implementations, the information may include configuration data to join networks, AR sessions, obtain device control, etc. In some implementations, the information included in identifiers 222 may include image data such as images stored for authentication purposes, as may be stored in image authentication database 242.

The system 200 includes cloud anchor application 220 that may be used to interact with cloud anchors for purposes of authenticating particular locations and features associated with devices and images captured by such devices. For example, if the wearable computing device 104-1 receives a request to authenticate a particular user or device, the system 200 may be accessed to determine a location of one or more controllable devices 108 in environment 102. A user operating wearable computing device 104-1 may point the image sensor 212 of the sensor system 210 at a particular other user or device (e.g., to controllable 108-1) and move the wearable device 104-1 around to map the environment from different viewing angles and positions. Such maps may be stored in a server map database 234 or on a device as cloud anchor data 218.

In operation, the cloud anchor application 220 receives data from the sensor system 210 and generates cloud anchor data 218, which includes visual data 224, device pose(s) 226, and anchor pose(s) 228. The wearable device 104-1 may generate or access 3D maps 230 based on the cloud anchor data 218. In some implementations, the wearable device 104-1 may instead access the cloud anchor data 218 at the server computer 202. The server computer 202 may include a visual positioning data service 232 to generate the cloud anchor data 218, and to generate maps 230 for a map database 234. The maps 230 may be generated, in this example, by a 3D map generator 236 associated with a particular physical and/or virtual environment.

The wearable device 104-1 may determine a pose and/or position 240 based on an onboard camera 238 or image sensor 212. The position 240 may be a 3D position of a controllable device 108-1, where the 3D position 240 is a location (and, optionally, orientation) of the controllable device 108-1 in a 3D physical environment in which the user (and/or the wearable device 104-1) is operating within. In some examples, the position includes a three DoF position 240a of a controllable device or of a wearable device. In some examples, the position 240 includes a six DoF position 240b of a controllable device or of a wearable device. In some implementations, the position 240 includes a five DoF position 240c of a controllable device or of a wearable device.

The wearable device 104-1 also includes a gesture detector 244. The gesture detector 244 may access sensor system 210 to detect and translate received gestures captured by cameras 238 and/or image sensor 212 of device 104-1. In some implementations, the gesture detector 244 may recognize and translate gestures into input for accessing and/or controlling particular controllable devices. In some implementations, the gesture detector 244 receives a user provided gesture and interprets a pattern in the gesture to translate the pattern into an input for a controllable device in environment 102, for example. In some implementations, the camera 238 may represent a low resolution camera on a wearable device 104-4 in which the camera is embedded on an edge of the smartwatch, which can also track, view, and translate captured image data from cloud anchors 110 for authentication purposes.

The wearable device 104-1 also includes control system 246 including various control system devices to facilitate operation of the wearable device 104-1. The control system 246 may include a processor 314 operably coupled to the components of the wearable device 104-1.

The wearable device 104-1 also includes a communication module 248. The communication module 248 may enable the wearable device 104-1 to communicate to exchange information with another computing device and authenticate other devices within range of the device 104-1 or other identifiable element in the environment. For example, the wearable device 104-1 may be operably coupled to another computing device, to facilitate communication via, for example, a wired connection, a wireless connection via for example, Wi-Fi or Bluetooth, or other type of connection.

In some implementations, the wearable device 104-1 is configured to communicate with the server computer 202 over a network 250. The server computer 202 may represent one or more computing devices that take the form of a number of different devices, for example a standard server, a group of such servers, or a rack server system. In some implementations, the server computer 202 is a single system sharing components such as processors and memories. The network 250 may include the Internet and/or other types of data networks, such as a local area network (LAN), a wide area network (WAN), a cellular network, satellite network, or other types of data networks. The network 250 may also include any number of computing devices (e.g., computer, servers, routers, network switches, etc.) that are configured to receive and/or transmit data within network 250.

The server computer 202 includes one or more processors (not shown) which may be formed in a substrate configured to execute one or more machine executable instructions or pieces of software, firmware, or a combination thereof. The processor(s) can be semiconductor-based—that is, the processors can include semiconductor material that can perform digital logic. The server computer 202 includes one or more memory devices (not shown). The memory devices may include a main memory that stores information in a format that can be read and/or executed by the processors.

In some examples, the server computer 202 is configured to execute a visual positioning data service 232. The visual positioning data service 232 may be an augmented reality (AR) collaboration service that allows users to create cloud anchors (e.g., 3D maps 230) for creating multiplayer or collaborative AR experiences that users can share. For example, users can configure virtual content and/or controllable devices 108 in which other users can view, authenticate to, and/or otherwise interact with from different positions in a shared physical environment.

For example, a user may create a local cloud anchor (e.g., a 3D map 230) in their environment. During hosting, the wearable device 104-1 may upload data to generate the 3D map 230 at the visual positioning data service 232, which the visual positioning data service 232 returns a unique identifier 222 for accessing a particular controllable device. The unique identifier 222 can be distributed to other users to join the same AR environment or in some implementations to access the controllable devices after authenticating using the identifier 222 associated with the cloud anchor data 218.

Although FIG. 2 illustrates a single wearable device 104-1 and two controllable devices 108, the implementations described herein may encompass any number of such systems (e.g., more than two). Although FIG. 1 illustrates fewer device elements than the systems depicted in FIG. 2, the devices depicted in FIG. 1 may include (or have access to) any or all of the elements of the system of FIG. 2.

Figure 3A:
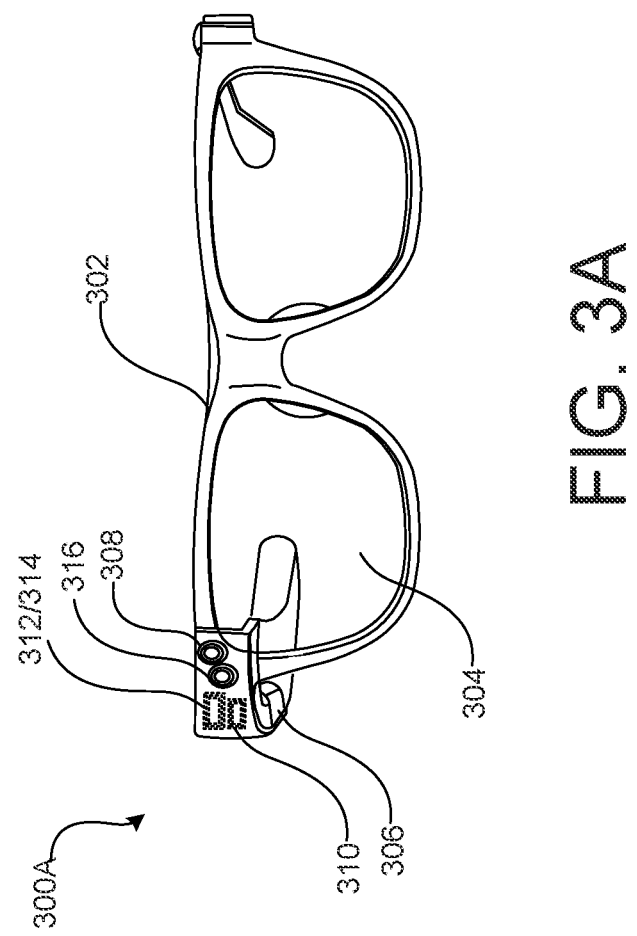
FIGS. 3A-3B illustrate an example of an electronic wearable device, according to implementations described throughout this disclosure.
Figure 3B:
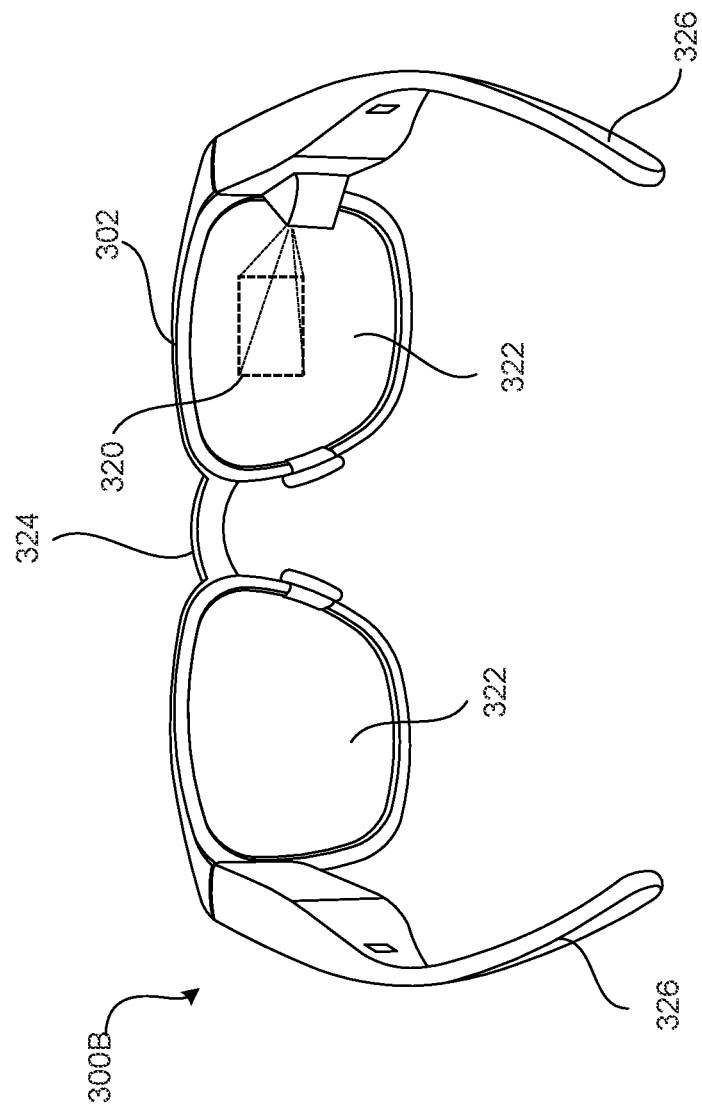

FIGS. 3A-3B illustrate various views of an example of an AR wearable device, according to implementations described throughout this disclosure. FIG. 3A is a front view of an example of a wearable device, according to implementations described throughout this disclosure. In this example, the wearable device is a pair of AR glasses 300A (e.g., wearable electronic device 104-1 in FIG. 1). In general, the AR glasses 300A may include any or all components of system 200. AR glasses 300A may also be indicated as smartglasses representing an optical head-mounted display device designed in the shape of a pair of eyeglasses. For example, smartglasses are glasses that add information (e.g., project a display) alongside what the wearer views through the glasses.

Although AR glasses 300A are shown as the wearable electronic device described herein, other types of wearable devices are possible. For example, the wearable device may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable device may be a watch, a mobile device, a piece of jewelry, a ring controller, or other wearable controller.

As shown in FIG. 3A, the AR glasses 300A include a frame 302, with a display device 304 coupled in the frame 302 (or in the glass portion of frame 302). The AR glasses 300A also include an audio output device 306, an illumination device 308, a sensing system 310, a control system 312, at least one processor 314, and a camera 316.

The display device 304 may include a see-through near-eye display such as those using birdbath or waveguide optics. For example, such an optical design may project light from a display source onto a portion of teleprompter glass functioning as a beamsplitter seated at a 45 degree angle. The beamsplitter may allow for reflection and transmission values that allow the light from the display source to be partially reflected while the remaining light is transmitted through. Such an optic design may allow a user to see both physical items in the world next to digital images (e.g., UI elements, virtual content, etc.) generated by the display. In some implementations, waveguide optics may be used to depict content on display device 304 of AR glasses 300A.

The audio output device 306 (e.g., one or more speakers) may be coupled to the frame 302. The sensing system 310 may include various sensing devices and the control system 312 including various control system devices to facilitate operation of the AR glasses 300A. The control system 312 may include a processor 314 operably coupled to the components of the control system 312.

The camera 316 may be capable of capturing still and/or moving images. In some implementations, the camera 316 may be a depth camera that can collect data related to distances of external objects from the camera 316. In some implementations, the camera 316, may be a point tracking camera that can, for example, detect and follow one or more optical markers on an external device, such as, for example, optical markers on an input device or finger on a screen. In some implementations, the AR glasses 300A may include an illumination device 308 that may selectively operate, for example, with the camera 316, for detection of objects (e.g., virtual and physical) in the field of view of the camera 316. The illumination device 308 may selectively operate, for example, with the camera 316, for detection of objects in the field of view of the camera 316.

AR glasses 300A may include a communication module (e.g., communication module 248) in communication with processor 314 and control system 312. The communication module may provide for communications between devices housed within AR glasses 300A as well as communication with external devices, such as, for example, controllers, mobile devices, and/or other computing devices. The communication module may enable the AR glasses 300A to communicate to exchange information with another computing device and authenticate other devices within range of the AR glasses 300A or other identifiable element in the environment. For example, the AR glasses 300A may be operably coupled to another computing device, to facilitate communication via, for example, a wired connection, a wireless connection via for example, Wi-Fi or Bluetooth, or other type of connection.

FIG. 3B is a rear view 300B of the AR glasses 300A, according to implementations described throughout this disclosure. The AR glasses 300B may be an example of the wearable devices 104-1 or 104-2 100 of FIG. 1. The AR glasses 300B are glasses that add information (e.g., project a display 320) alongside what the wearer views through the glasses. In some examples, instead of projecting information, the display 320 is an in-lens micro display. In some examples, AR glasses 300B (e.g., eyeglasses or spectacles), are vision aids, including lenses 322 (e.g., glass or hard plastic lenses) mounted in the frame 302 that holds them in front of a person's eyes, typically utilizing a bridge 324 over the nose, and bows 326 (e.g., temples or temple pieces) which rest over the ears.

Figure 4:
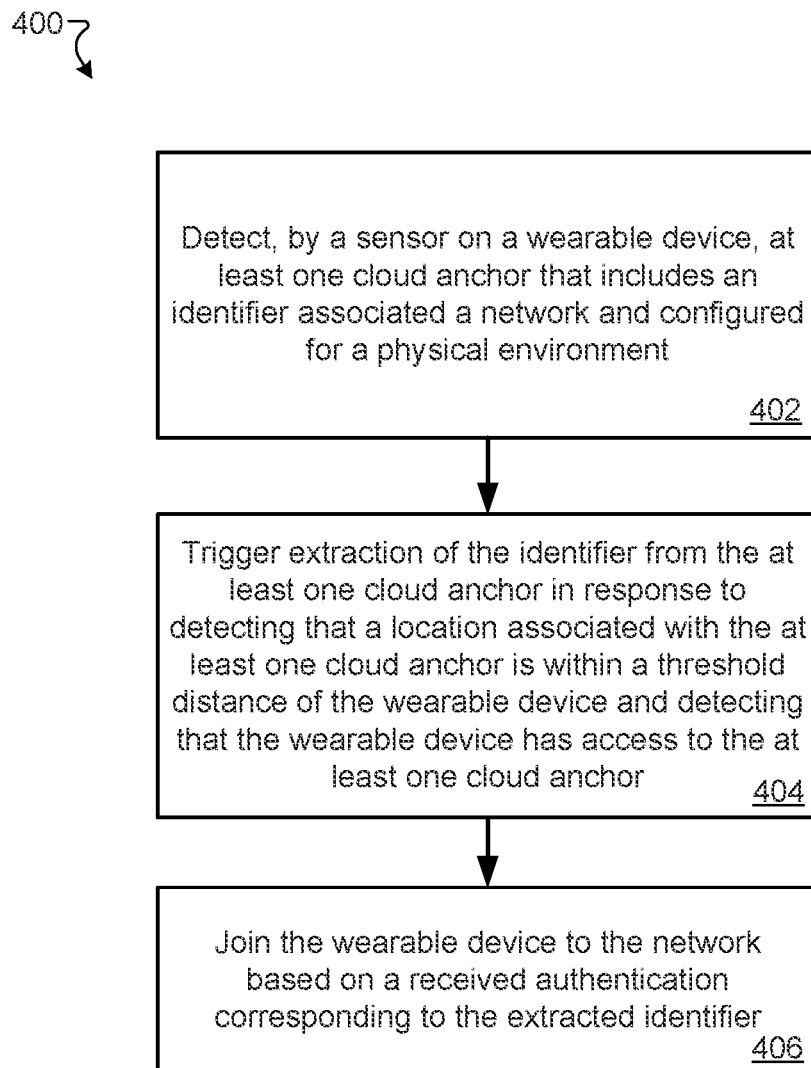
FIG. 4 is a flow chart diagramming an example of a process to join a network, according to implementations described throughout this disclosure.

FIG. 4 is a flow chart diagramming an example of a computer-implemented process 400 to join a network, according to implementations described throughout this disclosure. In general, process 400 utilizes the systems and algorithms described herein to enable a user device (e.g., a wearable device) to scan a physical environment to identify a number of cloud anchors in the environment, retrieve relevant AR content using the cloud anchor, identify and/or retrieve network credentials by using the cloud anchor which may enable the user device to join a network of the canned environment based on the use of the identified network credentials.

The process 400 may utilize a computing system with at least one processing device and memory storing instructions that when executed cause the processing device to perform the plurality of operations and computer implemented steps described in the claims. In general, the systems 100, 200, and/or system 600 may be used in the description and execution of process 400.

At block 402, the process 400 includes detecting, by a sensor on a wearable device, at least one cloud anchor that includes an identifier associated with a network and configured for a physical environment. For example, the image sensor 212 or audio sensor 216 of wearable device 104-2, of user 106 entering the environment 102, may detect a cloud anchor 110 having an identifier 222 associated with a network (e.g., a network 250) in physical environment 202. The cloud anchor 110 may be configured for the physical environment, as described throughout this disclosure.

In some implementations, the identifier may include an SSID and login credentials, for example if the network is a Wi-Fi network for a router device (e.g., controllable device 108-2). In some implementations, the identifier is associated with at least one controllable device, where the at least one controllable device is a device providing access to the network. For example, the controllable device may be device 108-2 (i.e., the network router). In some implementations, the controllable device may instead be the electronic assistant device 108-1, which can be configured to control the second controllable device 108-2 providing the network (i.e., via the router).

At block 404, the process 400 includes triggering extraction of the identifier from the at least one cloud anchor in response to detecting that a location associated with the at least one cloud anchor is within a threshold distance of the wearable device and detecting that the wearable device has access to the at least one cloud anchor. For example, in response to detecting that a location of the cloud anchor 110 is within a threshold distance of the wearable device 104-2 and detecting that the wearable device 104-2 has access to the at least one cloud anchor 110, the identifier 222 may be extracted from the cloud anchor 110 and provided to one or more devices associated with the network, for example, or to one or more devices (e.g., controllable device 108-2) associated with the physical environment 102 or another environment communicably coupled to the physical environment 102. In some implementations, the proximity to a particular location is determined based on detecting that the cloud anchor 110 is within a field of view of the wearable device 104-2 or another device within environment 102.

In some implementations, the cloud anchor that provides access to the network is an integral component providing the network. For example, one or more cloud anchors (e.g., cloud anchor 110) may be configured to allow and disallow particular network access. In some implementations, the cloud anchor 110 may include information that may be used as a gateway to connect to the network provided by controllable devices 108-1 and/or 108-2 and/or other controllable device available within environment 102 and/or accessible to wearable device 104-2, for example. The information may include usernames, passwords, location data with which to confirm devices via the cloud anchor, or other data stored at a cloud anchor of environment 102 that may be matched to visual data captured by wearable device 104-2.

In some implementations, the cloud anchor may not be associated with a controllable device directly, but may instead be configured as a resource in which to verify user or device identity, user or device location, or other environment 102 details, etc. before generating responses to requests to authenticate to particular networks or devices in environment 102, for example.

In some implementations, the identifier 222 is associated with a 3D map 230 of an Augmented Reality (AR) environment 102. The 3D map 230 may include visual data 224 mapped to the physical environment 102 and stored at the at least one controllable device 108-2 within the physical environment 102. In some implementations, detecting that the wearable device 104-2 has access to the at least one cloud anchor 110 includes determining whether the wearable device 104-2 provides data from the sensor 212 to match at least a portion of the visual data 224 mapped to the physical environment 102.

At block 406, the process 400 includes joining the wearable device 104-2 to the network based on a received authentication of the provided identifier. For example, the authentication may be generated by the cloud anchor and sent to the wearable device 104-2. In some implementations, the authentication may be generated and sent to the wearable device 104-2 by the controllable device 108-2. For example, upon receiving the correct identifier 222, the wearable device 104-2 may be authenticated to controllable device 108-2, which may trigger automatic joining of the wearable device 104-2 to the network provided by controllable device 108-2.

In some implementations, the at least one controllable device 108-2 is configured to de-authenticate the wearable device 104-2 from the network, in response to detecting that the location of the wearable device is no longer within the threshold distance. In some implementations, the threshold distance may correspond to a threshold time in which it is determined, based on detecting that a particular wearable device 104-2 no longer has access to particular cloud anchors 110, that a time has elapsed and the device 104-2 can no longer view particular cloud anchors. At such a time, the Wi-Fi may be de-authenticated on the wearable device 104-2. In some implementations, the cloud anchor may be configured to trigger de-authentication of a particular device based on detecting that such a device is outside of a threshold distance.

In some implementations, the process 400 includes detecting, by a sensor on a wearable device, at least one cloud anchor that includes an identifier associated with at least one controllable device configured for a physical environment. For example, the image sensor 212 or audio sensor 216 of wearable device 104-2, of user 106 entering the environment 102, may detect a cloud anchor 110 having an identifier 222 associated with a controllable device 108-2 (e.g., a network router) in physical environment 102.

In some implementations, the process 400 includes triggering extraction of the identifier from the at least one cloud anchor and providing the identifier to at least one controllable device in response to detecting that a location of the at least one controllable device is within a threshold distance of the wearable device and detecting that the wearable device has access to the at least one cloud anchor. For example, in response to detecting that a location of the at least one controllable device 108-2 is within a threshold distance of the wearable device 104-2 and detecting that the wearable device 104-2 has access to the at least one cloud anchor 110, the identifier 222 may be extracted from the cloud anchor 110 and provided to the controllable device 108-2.

In some implementations, the identifier may include an SSID and login credentials, for example if the network is a Wi-Fi network for the router (e.g., controllable device 108-2). The at least one controllable device may be a device providing access to the network. For example, the controllable device may be device 108-2 (i.e., the network router). In some implementations, the controllable device may instead be the electronic assistant device 108-1, which can be configured to control the second controllable device 108-2 providing the network (i.e., the router). In some implementations, the location is determined based on a detecting that the cloud anchor 110 is within a field of view of the wearable device 104-2.

In some implementations, the controllable device that provides access to the network is an integral component providing the network. For example, if the controllable device is the router controllable device 108-2, device 108-2 may control access to the network and/or control access to other devices (e.g., 104-1, 104-2, 104-3, 106-1, 106-2, 108-1) that may access the network via the router controllable device 108-2.

In some implementations, the cloud anchor 110 may include information that may be used as a gateway to connect to the network provided by controllable devices 108-1 and/or 108-2 and/or other controllable device available within environment 102 and/or accessible to wearable device 104-2, for example. The information may include usernames, passwords, location data with which to confirm devices via the cloud anchor, or other data stored at a cloud anchor of environment 102 that may be matched to visual data captured by wearable device 104-2.

In some implementations, the cloud anchor may not be associated with a controllable device directly, but may instead be configured as a resource in which to verify user or device identity, user or device location, etc. before generating responses to requests to authenticate to particular networks or devices in environment 102, for example.

In some implementations, the identifier 222 is associated with a 3D map 230 of an Augmented Reality (AR) environment 102. The 3D map 230 may include visual data 224 mapped to the physical environment 102 and stored at the at least one controllable device 108-2 within the physical environment 102. In some implementations, detecting that the wearable device 104-2 has access to the at least one cloud anchor 110 includes determining whether the wearable device 104-2 provides data from the sensor 212 to match at least a portion of the visual data 224 mapped to the physical environment 102.

In some implementations, the process 400 includes joining the wearable device 104-2 to the network based on a received authentication of the provided identifier at the controllable device 108-2. For example, upon receiving the correct identifier 222, the wearable device 104-2 may be authenticated to controllable device 108-2, which may trigger automatic joining of the wearable device 104-2 to the network provided by controllable device 108-2.

In some implementations, the at least one controllable device 108-2 is configured to de-authenticate the wearable device 104-2 from the network, in response to detecting that the location of the wearable device is no longer within the threshold distance. In some implementations, the threshold distance may correspond to a threshold time in which it is determined, based on detecting that a particular wearable device 104-2 no longer has access to particular cloud anchors 110, that a time has elapsed and the device 104-2 can no longer view particular cloud anchors. At such a time, the Wi-Fi may be de-authenticated on the wearable device 104-2.

Figure 5:
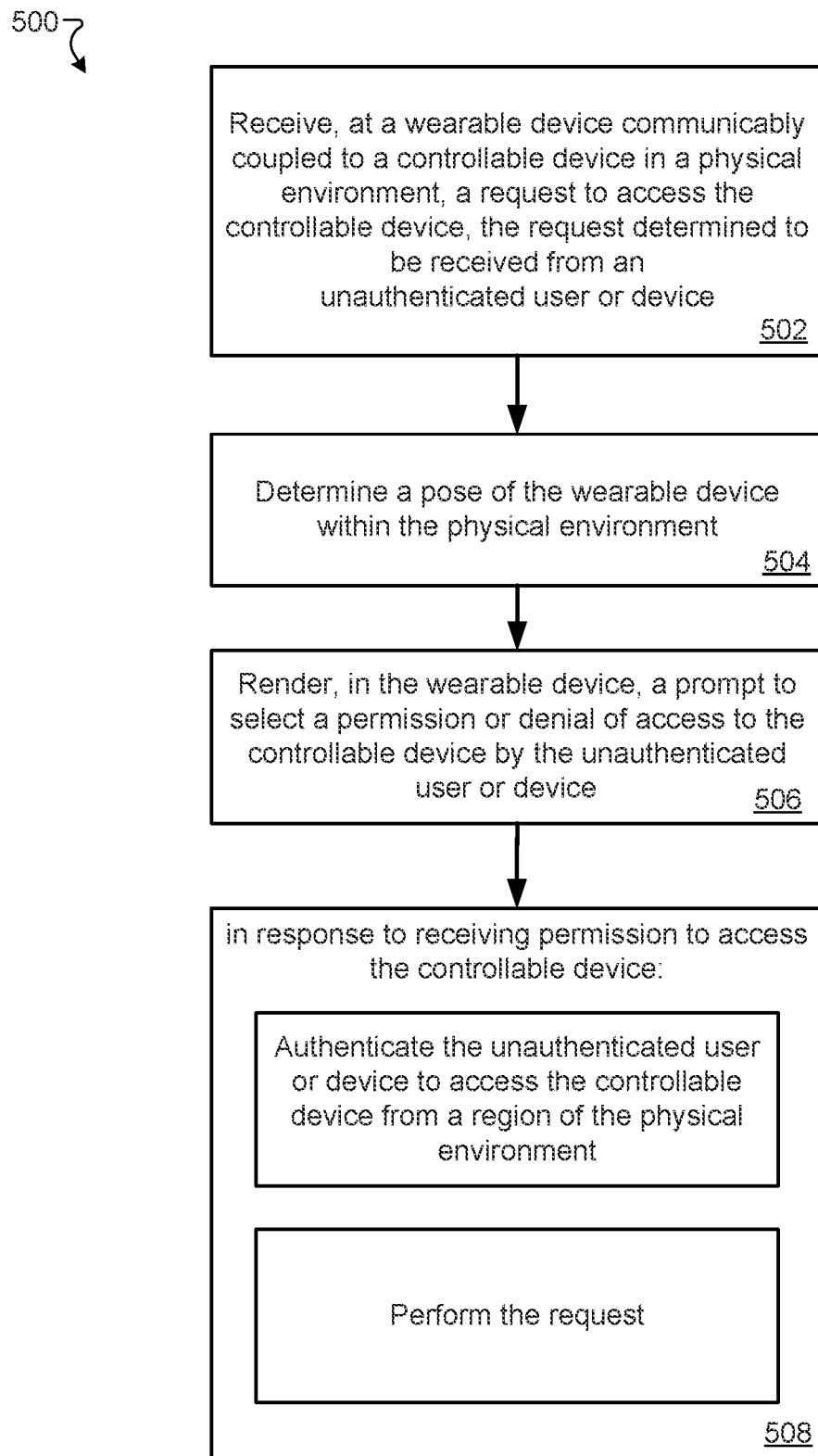
FIG. 5 is a flow chart diagramming an example of a process to authenticate to a controllable device, according to implementations described throughout this disclosure.

FIG. 5 is a flow chart diagramming an example of a computer-implemented process 500 to authenticate to a controllable device, according to implementations described throughout this disclosure. In this example, a wearable device 104-1 may be communicably coupled to a controllable device 108-1 (e.g., an electronic assistant device) that controls a resource (e.g., music) accessible by authenticated users. In general, process 500 utilizes the systems and algorithms described herein to detect that an unknown speaker provided a request of the controllable device 108-1, which may be configured to be operated by authenticated devices and/or users. The wearable device 104-1 may begin an authentication process by localizing (e.g., determining positions, poses, etc.) with respect to the physical environment 102. A microphone associated with the wearable device 104-1 may be used to determine a direction of a speaker providing an audial request. A device owner 104 wearing the wearable device 104-1 is prompted to permit or deny the request. In some implementations, the device owner 104 is prompted to look at (or in the direction of) the speaker providing the request. If the device owner 104 permits the request, the region of the room (e.g., described by a region of the sphere) is marked as authenticated.

In some implementations, the process 500 may also capture an image of the face of the speaker to generate and store an embedding (e.g. a high-dimensional feature vector). The embedding does not represent a real-world identity, but instead represents an appearance (or partial appearance) of the speaker that can be associated with a particular physical environment. In some implementations, the embedding ties to an identity associated with the controllable device 108-1 in order to efficiently control the device 108-1 by the user. For example, the identity may be tied to a speaker's playlists and thus, play music (e.g., indicator representing a request 116) may trigger playing such playlists.

In some implementations, facial features of the speaker (e.g., the requestor) may be compared against previously authorized faces stored at the wearable device or stored at a server computing system accessible to the wearable device. If the device owner 104 permits a received request, subsequent requests by the same speaker may be authenticated by the region of the room the request came from (using the same localization/pose as described above or using the stored facial features.

The process 500 may utilize a computing system with at least one processing device and memory storing instructions that when executed cause the processing device to perform the plurality of operations and computer implemented steps described in the claims. In general, the systems 100, 200, and/or system 600 may be used in the description and execution of process 500.

At block 502, the process 500 includes receiving, at a wearable device communicably coupled to a controllable device in a physical environment, a request to access the controllable device. For example, the wearable device 104-1 may receive a request from user 106, as indicated by audible request 114 in physical environment 102. In some implementations, the request may instead be received from wearable device 104-2 or device 106-2. The wearable device 104-1 may determine, using sensor system 210 and/or cloud anchor application 220, that the request is received from an unauthenticated user or device (i.e., user 106 or device 104-2, 106-2). If the request is determined to be received from an unrecognized or unauthorized user, the process 500 may begin an authentication check process.

At block 504, the process 500 includes determining a pose of the wearable device within the physical environment. For example, the wearable device 104-1 can determine its own position 240 (e.g., 3 DoF pose 240a or 6 DoF pose 240b or 5 DoF pose 240c) in the environment 102. The pose may be used in the event that an authentication occurs.

At block 506, the process 500 includes rendering, in the wearable device, a prompt to select a permission or denial of access to the controllable device by the unauthenticated user or device. For example, a prompt may be generated by wearable device 104-1 to present information to user 104. The information (e.g., prompts 113, 115) may include cloud anchor data, UI prompts to approve users and/or devices, or other data to assist user 104 in authorizing and/or otherwise authenticating access to one or more controllable devices. Other data may also be considered including, but not limited to image captured data, feature points associated with cloud anchors, or other discernible information from the scene. Such information may be used to generate particular prompts to the user.

At block 508, the process 500 includes authenticating the unauthenticated user (e.g., user 106) or device (e.g., device 104-2 or device 106-2) to access the controllable device (e.g., device 108-1, device 108-2) from a region (e.g., Region A of FIG. 1) of the physical environment 102 and performing the request 116 (i.e., to play music. For example, in response to receiving permission (e.g., gesture 112 and/or input at prompt 113, etc.) to access the controllable device, the process 500 may include authenticating the unauthenticated user or device to access the controllable device from a region of the physical environment. In response to receiving the permission to access the controllable device, the process 500 may also include performing the received request. The region (e.g., Region A) may be defined based on the determined pose of the wearable device 104-1. For example, a region may be defined within a spherical image of the physical environment 102 where the spherical image is based on a 3D map 230 of at least one cloud anchor 110 associated with the physical environment 102.

In some implementations, the process 500 may also include rendering, in the wearable device 104-1, for example, another prompt (e.g., prompt 115) to trigger a user of the wearable device to look in a direction corresponding to the region (e.g., Region A). Responsive to the user 104 looking in the direction of Region A, the wearable device 104-1 can capture an image of the region, which may capture all or a portion of the user 106 (or devices 106-2 or 104-2) requesting authentication. The image may be stored, by the wearable device 104-2 in a database of authenticated devices or users. In some implementations, the image may instead be stored at a server computer 202, for example. Such images may be used for future authentication requests.

For example, a second request to access the controllable device 108-1 may be received by the wearable device 104-1. The wearable device 104-1 may then render a prompt to trigger the user 104 of the wearable device 104-1 to capture an image associated with the second request. The wearable device 104-1 may receive a command (from user 104) to capture the image associated with the second request and may do so. The wearable device 104-1 may compare the second captured image to the images in the database 242, for example. In response to determining at least a portion of a match of the second captured image to at least one of the images in the database 242, the wearable device 104-1 may trigger the controllable device 108-1 to perform the second request.

In some implementations, the request is an audial request spoken by a user 106 in the physical environment 102. The wearable device 104-1 may determine a direction in which the audial request is received may determine the region of the physical environment based on the determined direction in which the audial request is received.

Figure 6:
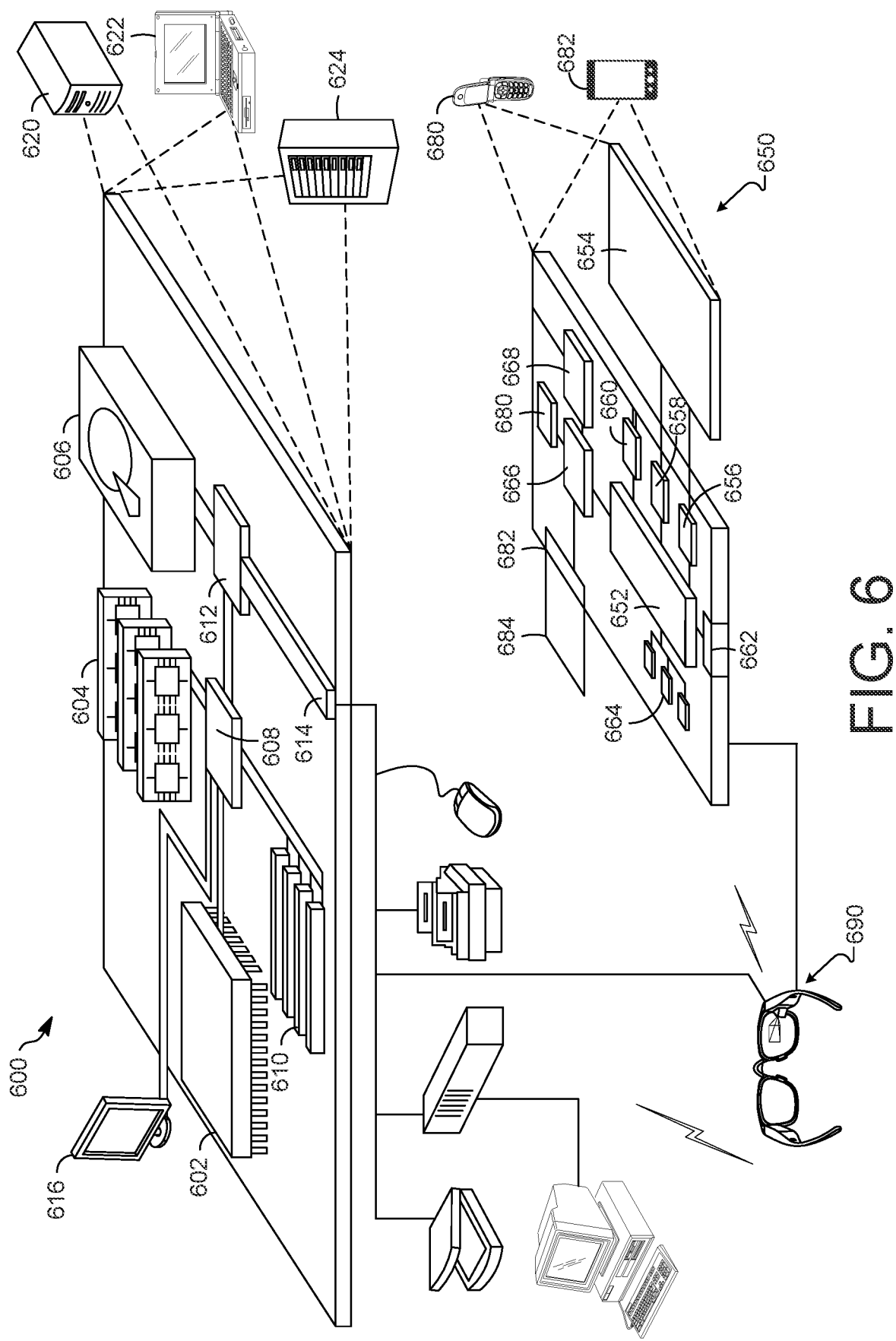
FIG. 6 shows an example of a computer device and a mobile computer device, which may be used with the techniques described herein.

FIG. 6 shows an example of a computer device 600 and a mobile computer device 650, which may be used with the techniques described here. Computing device 600 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In general, the computer-readable medium may be a non-transitory computer-readable medium.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 6 can include sensors that interface with a virtual reality or headset (VR headset/AR headset/HMD device 690). For example, one or more sensors included on computing device 650 or other computing device depicted in FIG. 6, can provide input to AR/VR headset 690 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 650 can use the sensors to determine an absolute position and/or a detected rotation of the computing device in the AR/VR space that can then be used as input to the AR/VR space. For example, computing device 650 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connect to, the computing device 650 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR/VR space can cause a particular action to occur in the AR/VR space.

In some embodiments, one or more output devices included on the computing device 650 can provide output and/or feedback to a user of the AR/VR headset 690 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 650 can be placed within AR/VR headset 690 to create an AR/VR system. AR/VR headset 690 can include one or more positioning elements that allow for the placement of computing device 650, such as smart phone 682, in the appropriate position within AR/VR headset 690. In such embodiments, the display of smart phone 682 can render stereoscopic images representing the AR/VR space or virtual environment.

In some embodiments, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR/VR space. As just one example, computing device can be a laser pointer. In such an example, computing device 650 appears as a virtual laser pointer in the computer-generated, 3D environment. As the user manipulates computing device 650, the user in the AR/VR space sees movement of the laser pointer. The user receives feedback from interactions with the computing device 650 in the AR/VR environment on the computing device 650 or on the AR/VR headset 690.

In some embodiments, a computing device 650 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method comprising:
    detecting, by a sensor on a wearable device, at least one cloud anchor that includes a network identifier identifying a network and configured for a physical environment;
    in response to detecting that a location associated with the at least one cloud anchor is within a threshold distance of the wearable device and detecting that the wearable device has access to the at least one cloud anchor, triggering extraction of the network identifier from the at least one cloud anchor; and
    connecting the wearable device to the network based on an authentication corresponding to the network identifier.

2. The computer-implemented method of claim 1, wherein:
    the network identifier includes an SSID and login credentials;
    the network is a Wi-Fi network;
    the network identifier is associated with at least one controllable device, the at least one controllable device being a device providing access to the network; and
    the authentication is received from the at least one controllable device.

3. The computer-implemented method of claim 1, wherein:
    the network identifier is associated with a 3D map of an Augmented Reality (AR) environment, the 3D map including visual data mapped to the physical environment stored by at least one controllable device within the physical environment; and detecting that the wearable device has access to the at least one cloud anchor includes determining whether the wearable device provides data from the sensor to match at least a portion of the visual data mapped to the physical environment.

4. The computer-implemented method of claim 2, wherein the at least one controllable device is configured to de-authenticate the wearable device from the network in response to detecting that the location of the wearable device is no longer within the threshold distance.

5. The computer-implemented method of claim 1, wherein the location is determined based on a detecting that the at least one cloud anchor is within a field of view of the wearable device.

6. A computer-implemented method comprising:
   receiving, at a wearable device communicably coupled to a controllable device in a physical environment, a request to access the controllable device, the request determined to be received from an unauthenticated device;
   determining a pose of the wearable device within the physical environment;
   rendering, in the wearable device, a prompt to select a permission or denial of access to the controllable device by the unauthenticated device; and
   in response to receiving permission to access the controllable device:
      authenticating the unauthenticated device to access the controllable device from a region of the physical environment, the region defined based on the pose of the wearable device, the region corresponding with a map of at least one cloud anchor associated with the physical environment, and
      performing the request.

7. The computer-implemented method of claim 6, wherein the map is a 3D map, the region is defined within a spherical image of the physical environment, the spherical image is based on the 3D map of the at least one cloud anchor.

8. The computer-implemented method of claim 6, further comprising:
   rendering, in the wearable device, another prompt to trigger a user of the wearable device to look in a direction corresponding to the region;
   capturing an image of the region, the image capturing a portion of the user or device requesting authentication; and
   storing, by the wearable device, the image in a database of authenticated devices or users.

9. The computer-implemented method of claim 8, further comprising:
   receiving a second request to access the controllable device;
   rendering, in the wearable device, a prompt to trigger the user of the wearable device to capture an image associated with the second request;
   receiving a command to capture the image associated with the second request;
   comparing the image associated with the second request to images in the database; and
   in response to determining at least a portion of a match of the image associated with the second request to at least one of the images in the database, triggering performance of the second request.

10. The computer-implemented method of claim 6, wherein:
   the request is an audial request spoken by a user in the physical environment;
   the wearable device determines a direction in which the audial request is received; and
   the region of the physical environment is determined based on the direction in which the audial request is received.

11. A computing system comprising:
   a wearable device including a sensor;
   at least one processing device; and
   a memory storing instructions that when executed cause the computing system to perform operations including:
      detecting, by the sensor of the wearable device, at least one cloud anchor that includes an identifier associated with a network and configured for a physical environment, the at least one cloud anchor including a visual feature representing a physical object in the physical environment;
      in response to detecting that a location associated with the at least one cloud anchor is within a threshold distance of the wearable device and detecting that the wearable device has access to the at least one cloud anchor, triggering extraction of the identifier from the at least one cloud anchor; and
      connecting the wearable device to the network based on an authentication corresponding to the identifier.

12. The computing system of claim 11, wherein:
   the identifier includes an SSID and login credentials;
   the identifier is associated with at least one controllable device, the at least one controllable device being a device providing access to the network; and
   the authentication is received from the at least one controllable device.

13. The computing system of claim 12, wherein the at least one controllable device is configured to de-authenticate the wearable device from the network in response to detecting that the location of the wearable device is no longer within the threshold distance.

14. The computing system of claim 11, wherein:
   the identifier is associated with a 3D map of an Augmented Reality (AR) environment, the 3D map including visual data mapped to the physical environment stored by at least one controllable device within the physical environment; and
   detecting that the wearable device has access to the at least one cloud anchor includes determining whether the wearable device provides data from the sensor to match at least a portion of the visual data mapped to the physical environment.

15. The computing system of claim 11, wherein the location is determined based on a detecting that the at least one cloud anchor is within a field of view of the wearable device.

16. A non-transitory, machine-readable medium having instructions stored thereon, the instructions, when executed by a processor, cause a computing device to:
   detect, by a sensor on a wearable device, at least one cloud anchor that includes an identifier associated with a network and configured for a physical environment, the at least one cloud anchor including a visual feature representing a physical object in the physical environment;
   in response to detecting that a location associated with the at least one cloud anchor is within a threshold distance of the wearable device and detecting that the wearable device has access to the at least one cloud anchor, trigger extraction of the identifier from the at least one cloud anchor; and connect the wearable device to the network based on an authentication corresponding to the identifier.

17. The non-transitory, machine-readable medium of claim 16, wherein:

the identifier includes an SSID and login credentials;

the identifier is associated with at least one controllable device, the at least one controllable device being a device providing access to the network; and the authentication is received from the at least one controllable device.

18. The non-transitory, machine-readable medium of claim 17, wherein the at least one controllable device is configured to de-authenticate the wearable device from the network in response to detecting that the location of the wearable device is no longer within the threshold distance.

19. The non-transitory, machine-readable medium of claim 16, wherein:

the identifier is associated with a 3D map of an Augmented Reality (AR) environment, the 3D map including visual data mapped to the physical environment stored by at least one controllable device within the physical environment; and detecting that the wearable device has access to the at least one cloud anchor includes determining whether the wearable device provides data from the sensor to match at least a portion of the visual data mapped to the physical environment.

20. The non-transitory, machine-readable medium of claim 16, wherein the location is determined based on a detecting that the at least one cloud anchor is within a field of view of the wearable device.

* * * * *